W. A. HUNTER.

STORM TOP.

APPLICATION FILED JAN. 23, 1908.

Reissued Dec. 13, 1910.

13,183.

2 SHEETS—SHEET 1.

ATTEST.

Bert. McStahl.
Edward N. Sarton

INVENTOR.

William A. Hunter.

BY Spear Middleton Donaldson & Spear

ATTYS.

THE NORRIS PETERS CO., WASHINGTON, D. C.

W. A. HUNTER.

STORM TOP.

APPLICATION FILED JAN. 23, 1908.

Reissued Dec. 13, 1910.

13,183.

2 SHEETS—SHEET 2.

ATTEST.

Bert M. Stahl.

Edward N. Sarton

INVENTOR.

William A. Hunter.

BY Spear Middleton Donaldson & Spear

ATTY'S.

THE NORRIS PETERS CO., WASHINGTON, D. C.

UNITED STATES PATENT OFFICE.

WILLIAM A. HUNTER, OF TERRE HAUTE, INDIANA, ASSIGNOR TO FOUTS & HUNTER CARRIAGE MANUFACTURING COMPANY, OF TERRE HAUTE, INDIANA.

STORM-TOP.

13,183. Specification of Reissued Letters Patent. Reissued Dec. 13, 1910.

Original No. 810,151, dated January 16, 1906, Serial No. 252,950. Application for reissue filed January 23, 1908. Serial No. 412,280½.

*To all whom it may concern:*

Be it known that I, WILLIAM A. HUNTER, a citizen of the United States, residing at No. 119 South Third street, Terre Haute, Indiana, have invented certain new and useful Improvements in Storm-Tops, of which the following is a specification.

My invention relates to removable storm tops for vehicles.

One object of the invention is to provide a light durable, and inexpensive top which may be readily applied to the vehicle in stormy weather, and detached therefrom when the necessity for its use is removed.

A further object is to provide a form of storm top which will completely inclose the occupants of the vehicle and in which all points may be positively storm tight yet may be readily and amply opened to permit entrance to and egress from the vehicle.

The invention is illustrated in the accompanying drawings in which:—

Figure 1:
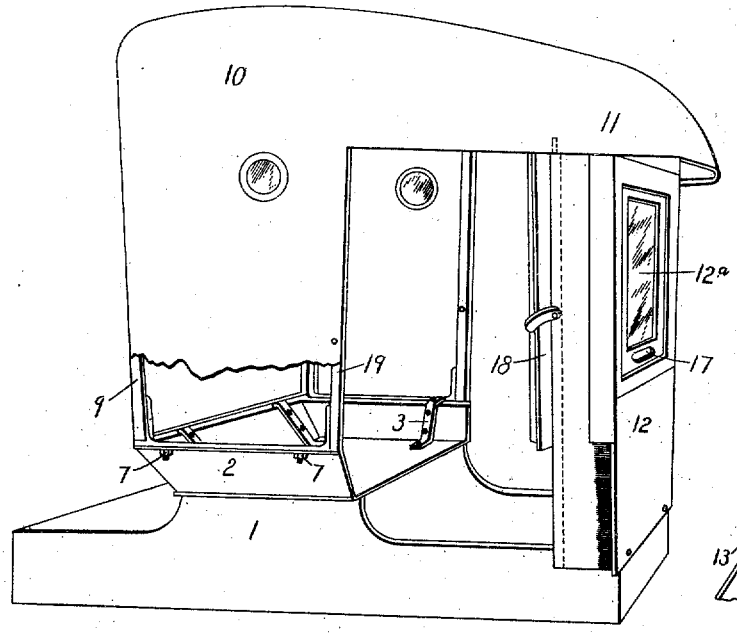
Figure 3:
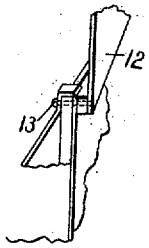
Figure 2:
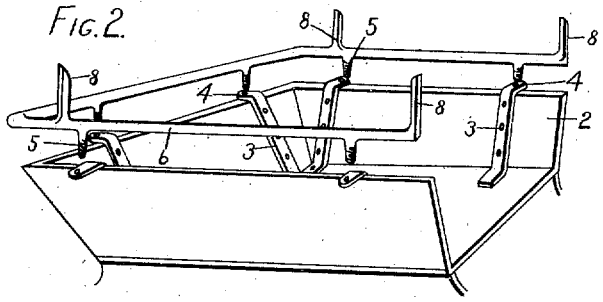
Figure 4:
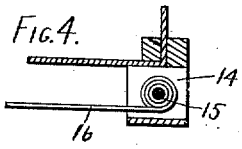
Figure 5:
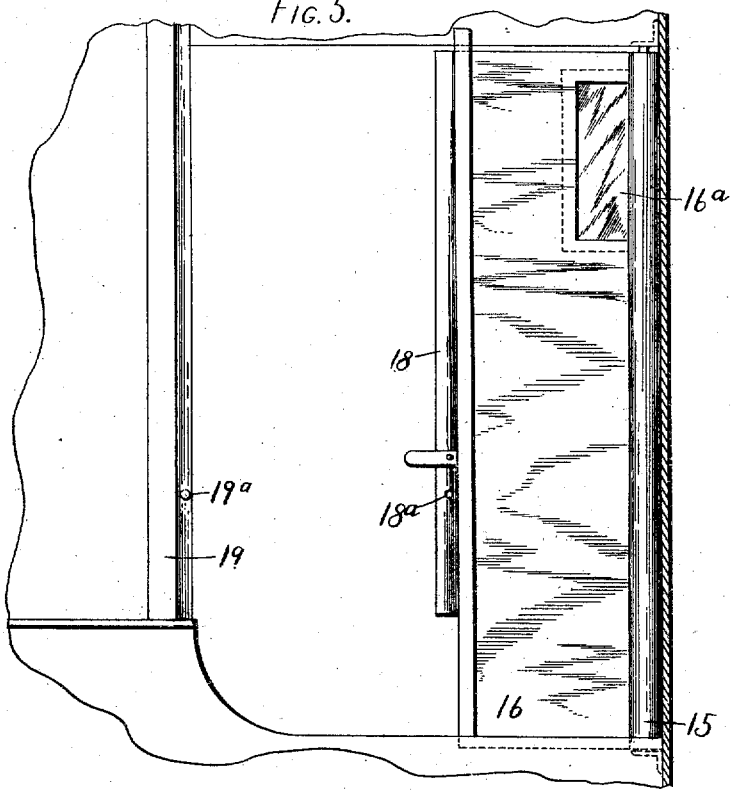
Figure 6:
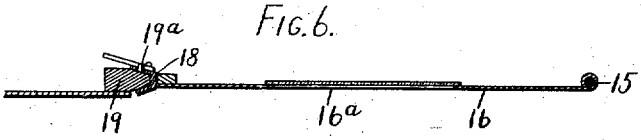
Figure 7:
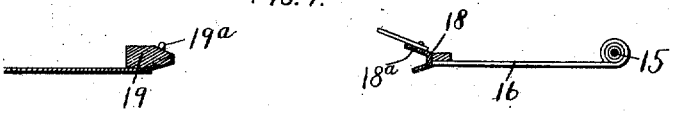

Figure 1 is a perspective view of a single seat buggy with the invention applied thereto. Fig. 2 is a perspective view with the removable rail raised. Fig. 3 is a detail view of the front fastening. Fig. 4 is a detail view of the curtain housing. Figs. 5, 6 and 7 are detail views.

Referring more particularly to these figures, the ordinal 1 designates the body of a buggy, which is shown as representative of any suitable uncovered vehicle to which the storm top is to be secured.

To the inside of the seat (indicated at 2) are secured strap or like irons 3, which have outwardly or horizontally turned ends, forming lugs 4, which are provided with holes to receive the downwardly projecting bolt extensions 5 of a rail 6. These extensions 5 correspond in number and location to the number of lugs 4 and are threaded to receive nuts 7, whereby the rail may be securely clamped to the lugs 4, and consequently to the buggy seat.

The rail 6 preferably corresponds in shape to the outer edge of the seat and is provided with a plurality of upwardly extending lugs or members 8 to which are secured vertical standards 9 and 19, which support the frame of the storm top. The rear or main portion of this, over the seat, is indicated at 10, and the vertical standards 19 form the front edge of this part of the top. The forwardly extending portion 11 of this top projects with a horizontal lower edge over the front part of the buggy box and its front end is formed with a downwardly curved hood. The storm front is shown at 12. The upper end of this is secured to the top underneath the hood so that without difficulty or care the connections between the front and the top are made water tight, as the hood covers the joint. The lower end of the storm front is connected detachably to the front panel or body by bolts as indicated at 13 in the detail view.

The front 12 is provided with a glass window 12ª and opening for the reins, as shown at 17.

For closing the space at the side I provide side curtains 16, which are wound under spring tension on vertical shafts or rollers 15, disposed within the corner frame members 14 of the front. The curtains may be thus drawn across to close in the side or released to permit entrance to and egress from the buggy. This form of the top as shown, leaves a rectangular, ample, unobstructed entrance and is adapted to the convenient rectangular form of the side curtains to the rear edge of which the vertical standard 19 perfectly conforms.

The top of the curtains may be guided in grooves in the lower edges of the frame of the storm top, but preferably overlap them on the inside, with the curtain stick projecting up on the inside of the hood, as indicated in dotted lines, Fig. 1. At the lower end the curtain overlaps the side panel of the box, but on the outside.

On the rear vertical or free edge of each curtain which carries a curtain stick, I secure a channeled strip 18, having a channel of preferably V shape, and each side post has a corresponding shaped front edge which enters the channel and effects an absolutely storm proof joint. An opening or eye 18ª in the strip receives a button 19ª on the post and holds the curtain closed.

I prefer to provide the curtain 16 with an opening 16ª, to the edges of which is secured a sheet of transparent flexible material, such as celluloid. I may also substitute for the sash 12ª a curtain having a transparent flexible pane therein.

It will be observed that the top is supported from the standards on the seat portion and is detachable therefrom by unscrewing the nuts on the extensions 5 without disturbing the seat.

Having thus described my invention what I claim is:

1. The combination with a vehicle body having a seat portion permanently carried thereby, a top carrying as one body therewith a shifting rail of substantially the same shape as the edge of the permanent seat portion and carrying also as one body therewith a depending front member, means for detachably connecting the shifting rail to the permanent seat portion, and means for detachably connecting the depending front to the body, and vertical roller curtains carried by the depending front and movable horizontally to close the side openings, substantially as described.

2. A storm top for vehicles comprising a top having depending sides and back and a forwardly extending hooded part, with means for detachably holding said top to the permanent seat of the vehicle body, a front member secured at its upper end to the top under the hooded part and depending therefrom with means for detachably connecting it at its lower end to the vehicle body, and means movably connected to a portion of said top for closing the side entrances thereof, said closing means consisting of spring roller curtains supported on said depending front and movable horizontally, the said top with its depending front and curtains being removable as one body from the permanent seat and body of the vehicle, substantially as described.

3. A detachable storm top for vehicles, comprising an upper cover member with sides depending therefrom and detachably connected with the vehicle body, and having a forwardly projecting hooded portion, a depending front member having its upper end secured to the cover member beneath the hooded front end thereof, said depending sides, depending front and cover member leaving at the sides substantially rectangular unobstructed openings, a pair of spring rollers mounted upon said depending front at opposite sides thereof, and each carrying a flexible curtain adapted to bridge the substantially rectangular side entrance, and means at the free ends of the curtains for storm proof inter-engagement with the vertical rails of the depending side members, substantially as described.

4. The combination with a vehicle body, of a storm top and front carried thereby, spring actuated side curtains for the sides of said top and a V shaped strip carried at the edge of each curtain designed to receive the correspondingly shaped frame member, substantially as described.

5. In combination with a vehicle top having a post, a curtain to close the side opening, a vertically disposed roller for the said curtain, a channel member at the free edge of the curtain interlocking with the post on the top, said interlocking member having its channel facing rearwardly, to make a storm tight joint with the post along the vertical edge of the curtain, substantially as described.

6. In combination with a vehicle top, a depending front and vertically arranged rollers carried by the front and having curtains thereon, said curtains having each an elongated strip at its free edge interlocking by a tongue and channel joint with the vertical post of the top to make a storm tight joint, substantially as described.

In testimony whereof, I affix my signature in presence of two witnesses.

WILLIAM A. HUNTER.

Witnesses:

V. H. Lockwood,

N. Allemong.